(12) United States Patent
Eleftheriou

(10) Patent No.: US 6,899,513 B2
(45) Date of Patent: May 31, 2005

(54) INFLATABLE COMPRESSOR BLEED VALVE SYSTEM

(75) Inventor: Andreas Eleftheriou, Woodbridge (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/613,007

(22) Filed: Jul. 7, 2003

(65) Prior Publication Data

US 2005/0008476 A1 Jan. 13, 2005

(51) Int. Cl.⁷ .............................................. F01D 25/12
(52) U.S. Cl. ..................... 415/1; 415/126; 415/144; 415/155; 415/156
(58) Field of Search ............................ 415/1, 126, 127, 415/144, 145, 155, 156, 159; 251/61.1

(56) References Cited

U.S. PATENT DOCUMENTS

| | | | |
|---|---|---|---|
| 2,698,711 A | * | 1/1955 | Newcomb .................... 415/145 |
| 2,874,926 A | * | 2/1959 | Gaubatz ...................... 251/61 |
| 3,057,541 A | | 10/1962 | Hasbrouck et al. |
| 3,279,192 A | | 10/1966 | Hull, Jr. et al. |
| 3,588,268 A | | 6/1971 | Hampton |
| 3,637,140 A | | 1/1972 | Palovchik |
| 3,756,026 A | | 9/1973 | Timms et al. |
| 3,849,020 A | | 11/1974 | Eastman |
| 3,967,443 A | | 7/1976 | McMurtry |
| 4,213,738 A | | 7/1980 | Williams |
| 4,246,752 A | | 1/1981 | Tryon |
| 4,251,985 A | | 2/1981 | Sullivan |
| 4,280,678 A | | 7/1981 | Roberts |
| 4,476,682 A | | 10/1984 | McInerney |
| 4,674,951 A | | 6/1987 | Jourdain et al. |
| 5,380,151 A | | 1/1995 | Kostka et al. |
| 6,048,171 A | | 4/2000 | Donnelly et al. |
| 6,161,839 A | | 12/2000 | Walton et al. |
| 6,390,772 B1 | | 5/2002 | Dziorny et al. |

FOREIGN PATENT DOCUMENTS

GB 1357016 A * 6/1974 ............ F04D/27/00

* cited by examiner

Primary Examiner—Ninh H. Nguyen
(74) Attorney, Agent, or Firm—Ogilvy Renault

(57) ABSTRACT

A compressor bleed valve system for bleeding air from a gas turbine engine compressor comprises a bladder inflatable between at least a collapsed position and an expanded position for selectively opening and closing a compressor airbleed passage.

23 Claims, 4 Drawing Sheets

INFLATABLE COMPRESSOR BLEED VALVE SYSTEM

BACKGROUND OF THE INVENTION

1. Field of the Invention

The present invention relates to gas turbine engines and, more particularly, to a system for bleeding air from a gas turbine engine compressor.

2. Description of the Prior Art

Gas turbine engines are generally provided with a compressor bleed valve system adapted under some operating conditions to bleed off compressor air before a surge condition is to happen.

Such compressor bleed valve systems typically comprise a plurality of valves circumferentially distributed about the compressor housing and linked to an actuator for synchronous operation. This leads to heavy and complex arrangements. Furthermore, each valve typically comprises a relatively large number of moving parts that are subject to premature wear due friction forces.

SUMMARY OF THE INVENTION

It is therefore an aim of the present invention to provide a simplified compressor bleed valve system.

It is also an aim of the present invention to provide a compressor bleed valve system which has a reduced number of movable parts and which is, thus, less subject to wear problems.

Therefore, in accordance with the present invention, there is provided a gas turbine engine comprising a main fluid flow path, a compressor forming a portion of said main fluid flow path, at least one passage for bleeding compressor air from said fluid flow path, and a compressor bleed valve system comprising a bladder inflatable between at least a collapsed position and an expanded position for controlling a flow of compressor air from said main fluid flow path through said at least one passage.

In accordance with a further general aspect of the present invention, there is provided a combination compressor bleed valve actuation and seal system for bleeding air from a gas turbine engine compressor, wherein the gas turbine engine compressor has at least one airbleed passage; the system comprising: a seal inflatable between at least a collapsed position, wherein said airbleed passage is opened, and an expanded position, wherein said seal closes said airbleed passage in order to prevent pressurized air from being bled off the gas turbine engine compressor.

In accordance with a still further aspect of the present invention, there is provided a combination compressor bleed valve actuation and seal system for bleeding air from a gas turbine engine compressor, wherein the gas turbine engine compressor has at least one airbleed passage; the system comprising a bladder inflatable between at least a collapsed position and an expanded position for selectively opening and closing said at least one airbleed passage.

In accordance with a still further general aspect of the present invention, there is provided a method of bleeding air from a gas turbine engine compressor, the compressor including a main air flow path in communication with a bleed passage, the method comprising the steps of: providing an inflatable member, and selectively varying an internal fluid pressure in said inflatable member to control and air flow from said main air flow path through said bleed passage.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
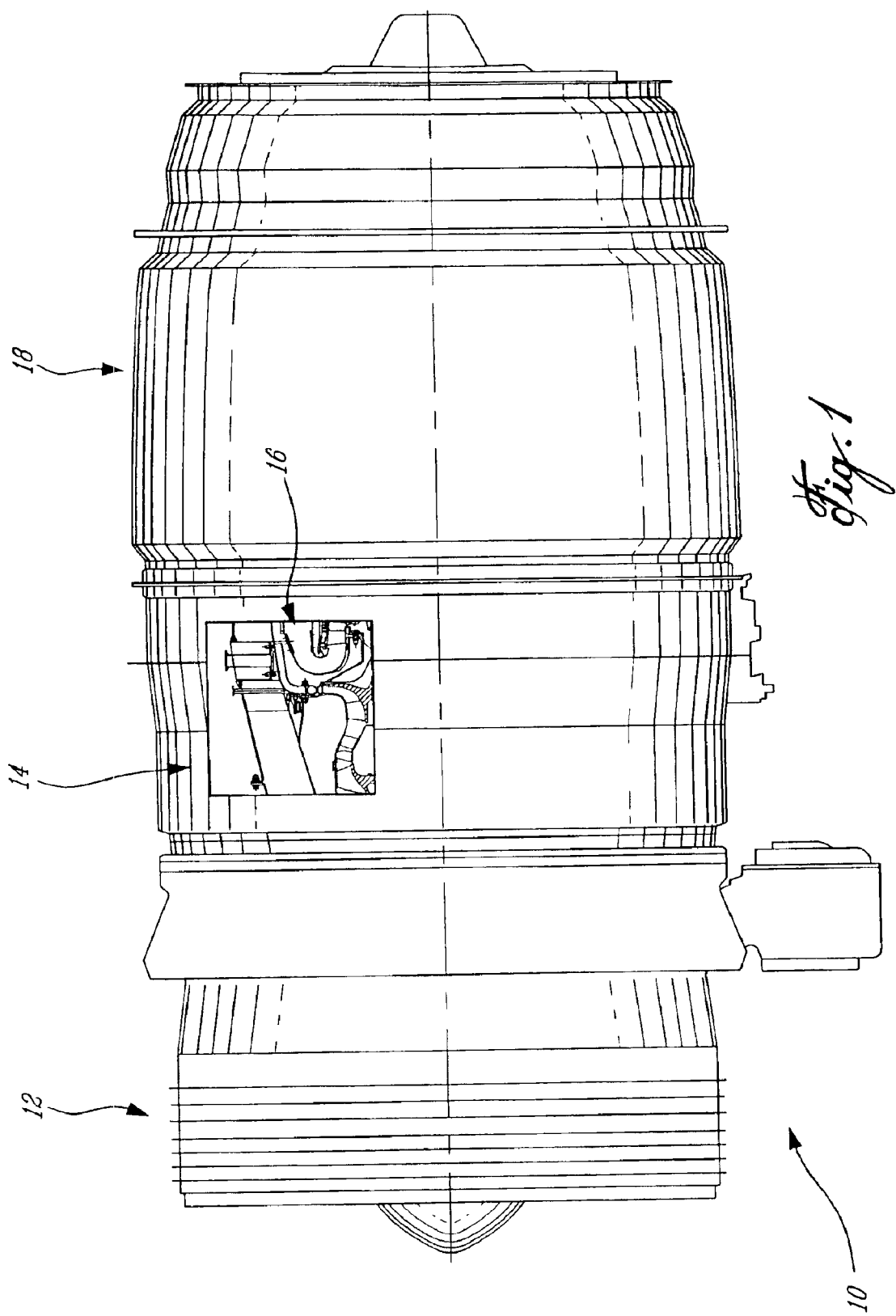
FIG. 1 is a side view, partly broken away, of a gas turbine engine to which an embodiment of the present invention is applied.

FIG. 1 illustrates a gas turbine engine 10 generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine 18 for extracting energy from the combustion gases.

Figure 2:
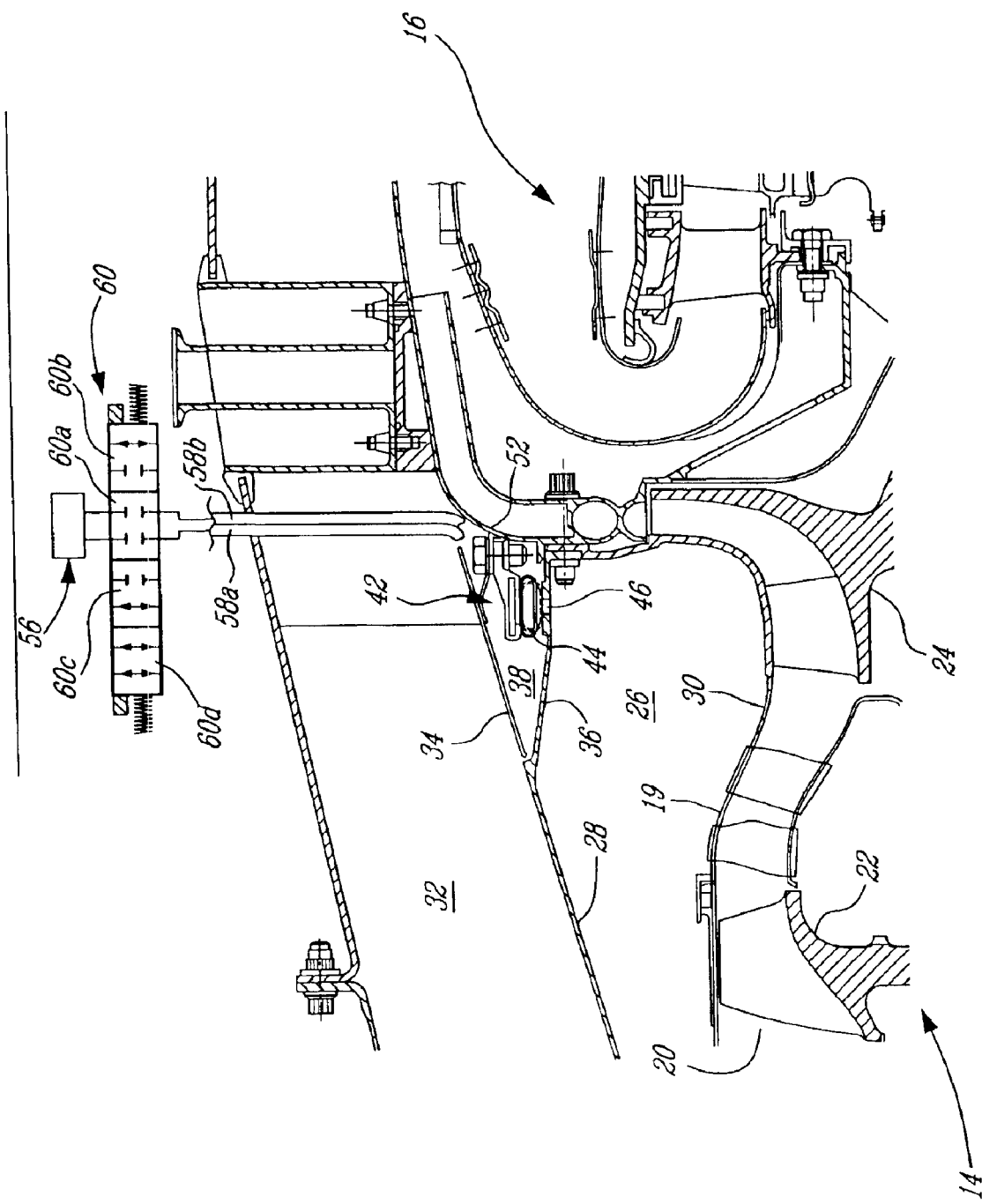
FIG. 2 is an axial cross-sectional view of a portion of a compressor section of the gas turbine engine showing the location of an inflatable compressor bleed valve system in the engine according to a preferred embodiment of the present invention.

As shown in FIG. 2, the compressor 14 comprises among others a shroud 19 defining an axially extending compressor flow path 20 in which are typically placed a low pressure rotor 22 followed by a high pressure rotor 24 for compressing the air flowing longitudinally through the compressor flow path 20. An annular plenum 26, radially bounded by the shroud 19 and a partition 28, circumscribes the compressor flow path 20. The annular plenum 26 is connected in fluid flow communication with the compressor flow path 20 by means of a series of circumferentially distributed bleed ports 30 defined in the shroud 19 just upstream of the high pressure compressor 24.

A co-annular bypass flow path 32 surrounds the annular plenum 26. As shown in FIG. 2, the partition 28 cooperates with an annular wall member 34 to form the inner circumferential wall of the bypass flow path 32. A projection 36 extends axially rearwardly from the partition 28 to form the inner boundary of a circumferentially extending annulus 38 provided radially intermediate the annular plenum 26 and the bypass flow path 32. The annulus 38 is in fluid flow communication with the bypass flow path 32 via a plurality of circumferentially distributed openings 40 (see FIG. 4) defined in the wall member 34.

Figure 3:
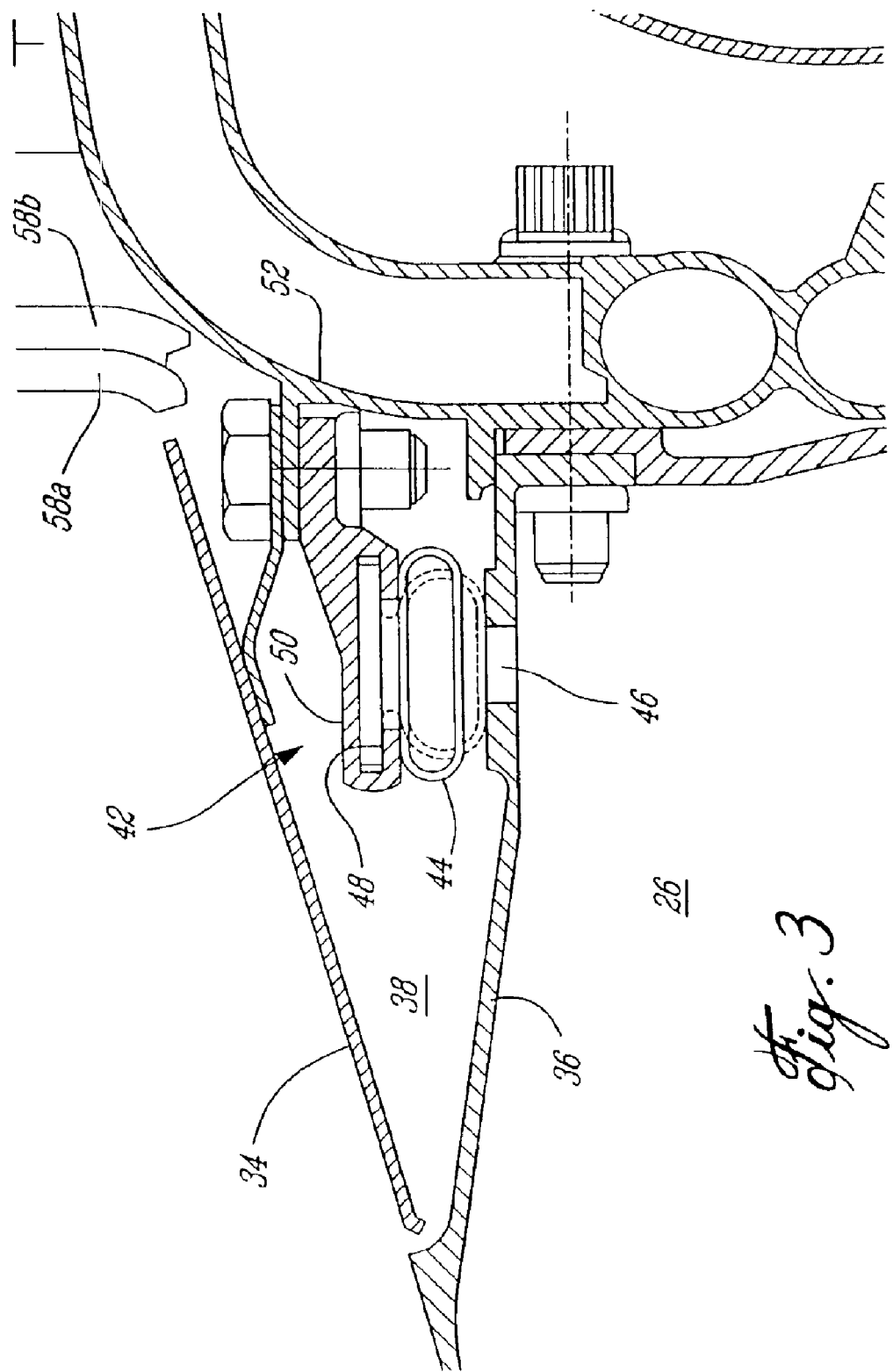
FIG. 3 is an enlarged axial cross-sectional view of a portion of FIG. 2 illustrating the details of the inflatable compressor bleed valve system.

The compressor 14 further comprises a bleed valve system 42 for selectively discharging pressurized air received in the plenum 26 from the compressor flow path 20 into the bypass flow path 32 via the annulus 38. As shown in FIG. 3, the bleed valve system 42 generally comprises a seal 44 inflatable between a collapsed position (shown in solid lines) and an expanded position (shown in broken lines), wherein the seal 44 is in sealing engagement with the radially outer surface of the projection 36 in order to close a series of circumferentially distributed bleed air control slots 46 defined in the annular projection 36. The seal 44 can be inflated to various intermediate positions to control the amount of compressor air flowing through the slots 46.

Figure 4:
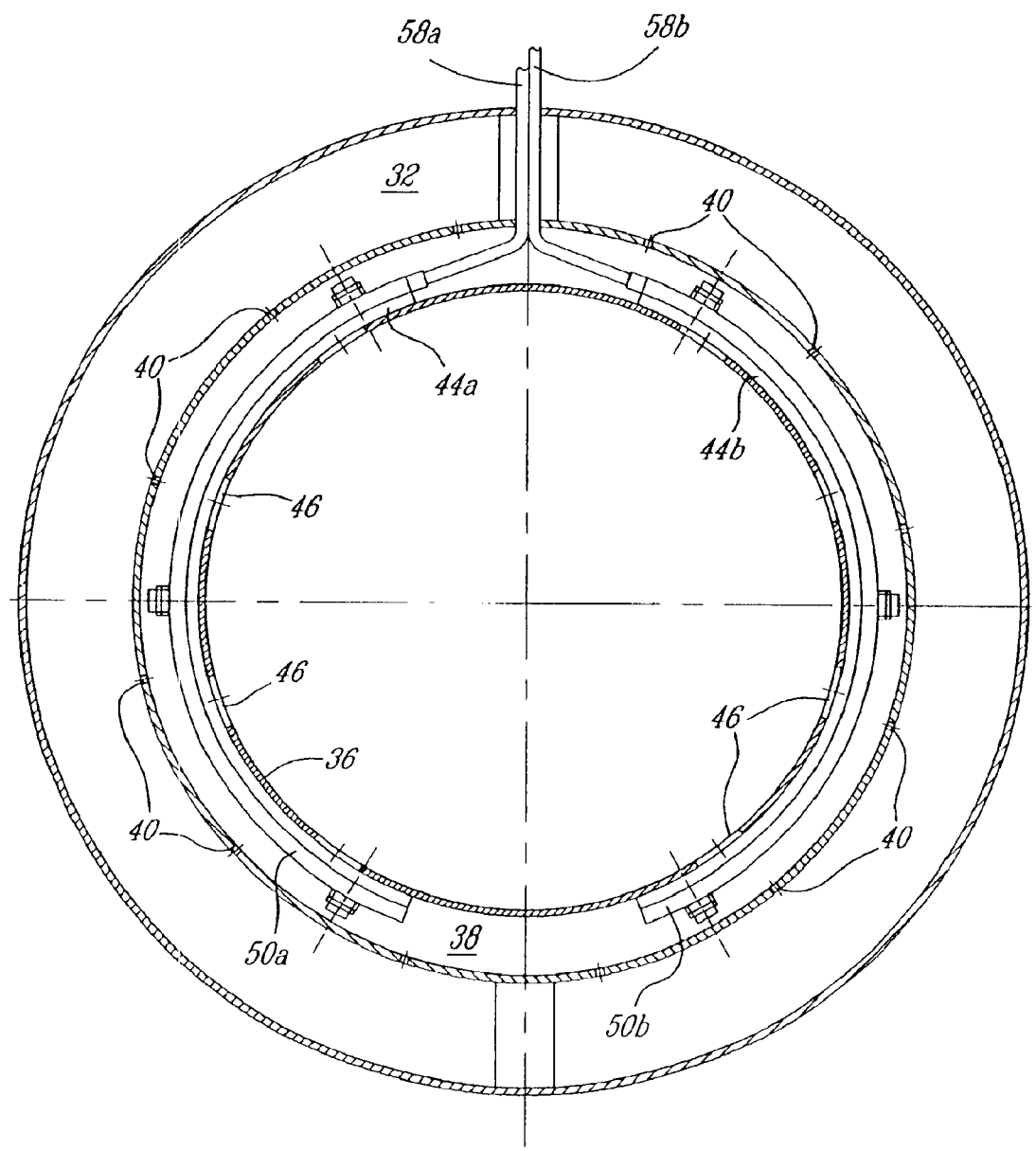
FIG. 4 is a cross-sectional end view of the inflatable compressor bleed valve system shown in FIG. 3.

As shown in FIG. 4, the inflatable seal 44 preferably comprises two separate rubberized sealing boots 44a and 44b, such as vinyl-coated polyester boots, mounted to a radially inwardly facing groove 48 (FIG. 3) of a seal carrier 50 extending about the projection 36. The carrier seal 50 is fixedly secured, such as by a bolt connection, to the forward end of the gas generator case 52 (FIG. 3) of the gas turbine engine 10. As shown in FIG. 4, the carrier 50 preferably includes first and second circumferentially oppositely extending ring segments 50a and 50b, each segment carrying respective ones of the rubberized boots 44a and 44b. According to the illustrated embodiment, each boot 44a/44b, when inflated, is arranged to sealingly close a series of four bleed air control slots 46 at a time.

As shown in FIG. 2, the sealing boots 44a and 44b are connected to a common source of pressurized fluid 56 (e.g. air bled from the compressor) via respective control lines 58a and 58b. Depending if the sealing boots 44a and 44b are pneumatically or hydraulically actuated, the source of pressurized fluid 56 could be air or a liquid, such as oil. A control valve, preferably in the form of a solenoid valve 60, is provided between the source of pressurized fluid 56 and the lines 58a and 58b. As schematically illustrated in FIG. 2, the valve 60a is displaceable between a first position 60a wherein both sealing boots 44a and 44b are isolated from the fluid pressure source 56, a second position 60b wherein only the second sealing boot 44b is connected in fluid flow communication with the fluid pressure source 56, a third position wherein only the first sealing boot 44a is connected in fluid flow communication with the fluid pressure source 56, and a fourth position 60d wherein both sealing boots 44a and 44b are connected in fluid flow communication with the fluid pressure source 56. Accordingly, the boots 44a and 44b can be independently inflated and deflated, thereby allowing selectively closing or opening only one series of airbleed slots 46 at a time.

When fluid pressure is provided to the boots 44a and 44b respectively through the control lines 58a and 58b, the boots 44a and 44b expand radially inwardly and sealingly cover the airbleed slots 46 to prevent compressor air from being discharged into the bypass flow path 32 via annulus 38 and the openings 40. However, when the fluid pressure is relieved off the control lines 58a and 58b, the boots 44a and 44b retract and uncover the airbleed control slots 46, thereby allowing the compressor air in the plenum 38 to pass into the annulus 38 and then into the bypass flow path 32 through the openings 40. As mentioned hereinbefore, the boots 44a and 44b can be inflated to various intermediate positions to provide incremental flow through the airbleed slots 46.

According to a further embodiment of the present invention, the boots 44a and 44b or other types of inflatable bladders could be used to actuate a conventional compressor bleed valve or the like. In this case, the sealing would not be made directly by the bladders. The bladders would only assume an actuating function. It will be understood that the present invention may be used to actuate, and perhaps seal as well, other valve systems on a gas turbine besides the exemplary bleed valve application described hereinbefore.

The present invention is advantageous as compared to conventional bleed valve systems in that there are no moving parts that can be affected by friction (piston, seal rings, guiding pins and bushings, guiding tracks, bearings or springs). Also, the present bleed valve system provides fast sealing and unsealing response. The system offers ease of installation and is readily accessible for maintenance or repair purposes. The system will fail at an open position (i.e. the boot in a deflated state) which is an important safety measure to prevent surge conditions to be reached. Finally, the system does not require any feedback to an electric engine control unit (EEC), since the solenoid valve 60 operates by discreet signals from the EEC.

What is claimed is:

1. A gas turbine engine comprising a main fluid flow path, a compressor forming a portion of said main fluid flow path, at least first and second passages for bleeding compressor air from said fluid flow path, and a compressor bleed valve system comprising a bladder inflatable between at least a collapsed position and an expanded position for controlling a flow of compressor air from said main fluid flow path through said at least first and second passages, said bladder including at least two inflatable segments selectively inflatable relative to one another for controlling fluid flow through a respective one of said first and second passages.

2. A gas turbine engine am defined in claim 1, wherein said at least first and second passages are at least partly opened when the bladder is deflated to said collapsed position thereof, and wherein said at least first and second passages are closed when said bladder is inflated to said expanded position thereof.

3. A gas turbine engine as defined in claim 2, wherein said bladder acts as an inflatable seal to sealingly close said at least first and second passages when inflated to said expanded position.

4. A gas turbine engine as defined in claim 3, wherein said at least first and second passages includes a plurality of spaced-apart passages, and wherein said bladder simultaneously seals at least two of said plurality of spaced-apart passages, when inflated to said expanded position.

5. A gas turbine engine as defined in claim 4, wherein said plurality of passages includes first and second series of passages, inflatable segments, each sealing a respective ones of said first and second series of passages.

6. A gas turbine engine as defined in claim 4, wherein said plurality of spaced-apart passages includes a row of circumferentially distributed passages, and wherein said bladder is positioned radially outwardly of said row of circumferentially distributed passages, said bladder being expandable radially inwardly towards said row of passages for controlling the flow of compressor air therethrough.

7. A gas turbine engine as defined in claim 6, wherein said least two inflatable segments are circumferentially oppositely disposed relative to one another.

8. A gas turbine engine as defined in claim 6, wherein said bladder is expandable radially inwardly from a support ring mounted between a by-pass flow path and said main fluid flow path.

9. A gas turbine engine as defined in claim 1, wherein said at least two inflatable segments are in fluid flow communication with a source of fluid pressure via a control valve, said control valve being displaceable between at least a first position wherein both said inflatable segments are connected in fluid flow communication with said source of fluid pressure and a second position wherein only a selected one of said inflatable segments is connected in fluid flow communication with said source of fluid pressure.

10. A gas turbine engine as defined in claim 1, wherein said at least two inflatable segments cooperate to form a circumferentially extending boot positioned about said main flow path, said boot being expandable radially inwardly to sealingly cover said at least first and second passages.

11. A combination compressor bleed valve actuation and seal system for bleeding air from a gas turbine engine compressor, wherein the gas turbine engine compressor has at least two airbleed passages; the system comprising: a seal including at least first and second boot segments independently inflatable for selectively opening and closing respective ones of the at least two airbleed passages.

12. A combination as defined in claim 11, wherein said seal is mounted to a circumferentially extending seal carrier, said seal projecting radially inwardly of said seal carrier when inflated to said expanded position.

13. A combination as defined in claim 11, wherein said first and second inflatable boot segments extend in circumferential opposite directions about said at least one airbleed passage.

14. A combination as defined in claim 11, wherein said first and second boot segments are in fluid flow communication with a source of fluid pressure via a control valve, said control valve being displaceable between at least a first position wherein both said first and second boot segments are connected in fluid flow communication with said source of fluid pressure and a second position wherein only a selected one of said boot segments is connected in fluid flow communication with said source of fluid pressure.

15. A combination compressor bleed valve actuation and seal system for bleeding air from a gas turbine engine compressor, wherein the gas turbine engine compressor has at least two airbleed passages; the system comprising a bladder including first and second boot segments separately inflatable between at least a collapsed position and an expanded position for selectively opening and closing respective ones of said at least two airbleed passages.

16. A combination as defined in claim 15, wherein said bladder acts as an inflatable seal to sealingly close said at least one passage when inflated to said expanded position.

17. A combination as defined in claim 16, wherein said inflatable seal is mounted to a circumferentially extending seal carrier, said seal projecting radially inwardly of said seal carrier when inflated to said expanded position.

18. A combination as defined in claim 15, wherein said first and second inflatable boot segments extend in circumferential opposite directions about said at least two airbleed passages.

19. A combination as defined in claim 15, wherein said first and second boot segments are in fluid flow communication with a source of fluid pressure via a control valve, said control valve being displaceable between at least a first position wherein both said first and second segments are connected in fluid flow communication with said source of fluid pressure and a second position wherein only a selected one of said boot segments is connected in fluid flow communication with said source of fluid pressure.

20. A method of bleeding air from a gas turbine engine compressor, the compressor including a main air flow path in communication with a plurality of bleed passages, the method comprising the steps of: a) providing an inflatable member having at least first and second separately inflatable boot segments, each segment defining a pressurizable chamber, and b) selectively varying an internal fluid pressure of said pressurizable chamber of said separately inflatable boot segments to control an air flow from said main air flow path through said bleed passages.

21. A method as defined in claim 20, wherein step b) comprises the step of inflating least a selected one of said boot segments to an expanded position wherein said least selected one of said boot segments substantially sealingly closes at least some of, said bleed passages.

22. A method as defined in claim 21, wherein said first and second boot segments, each cover a series of bleed passages, and wherein step b) further comprises the steps of selecting the series of bleed passages to be closed and inflating at least one of said first and second boot segments in accordance with the selected series of bleed passages.

23. A method as defined in claim 20, wherein said inflatable member includes a sealing boot extending about said main air flow path, and wherein step b) comprises the steps of expanding said sealing boot radially inwardly towards said bleed passages in order to incrementally limit the flow of air passing from said main air flow path through said bleed passages.

* * * * *

UNITED STATES PATENT AND TRADEMARK OFFICE
CERTIFICATE OF CORRECTION

PATENT NO. : 6,899,513 B2  
DATED : May 31, 2005  
INVENTOR(S) : Andreas Eleftheriou Page 1 of 1

It is certified that error appears in the above-identified patent and that said Letters Patent is hereby corrected as shown below:

<u>Column 4,</u>  
Line 14, delete "am" and insert -- as --.  
Line 31, delete "ones" and insert -- one --.

<u>Column 6,</u>  
Line 19, between "inflating" and "least", insert -- at --.  
Line 21, between "said" and "least", insert -- at --.

Signed and Sealed this

Sixteenth Day of August, 2005

JON W. DUDAS  
*Director of the United States Patent and Trademark Office*